Feb. 5, 1924.
W. MOORE
TILTING HEADLIGHT
Filed Jan. 8, 1923
1,482,656
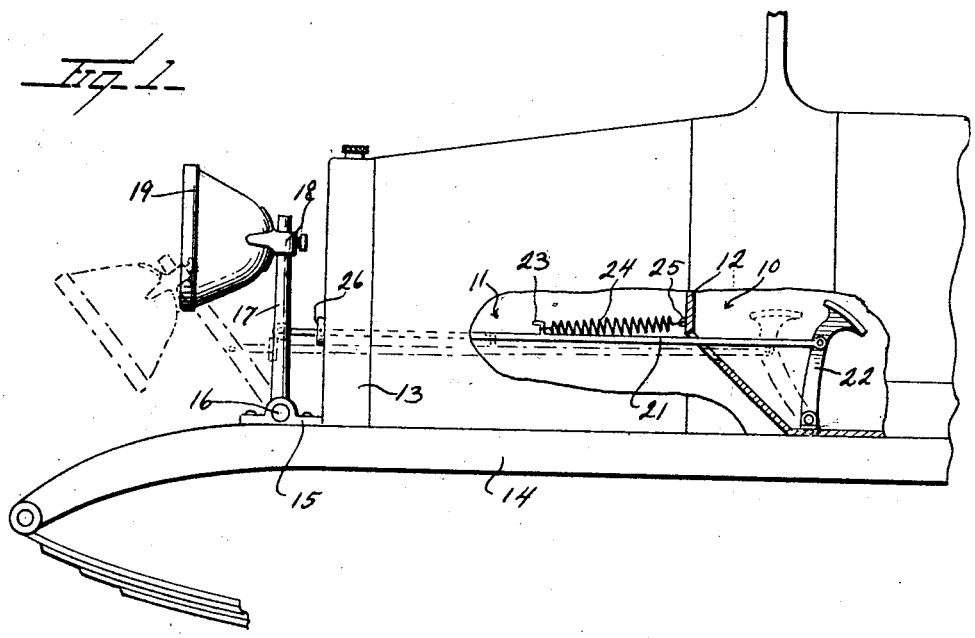
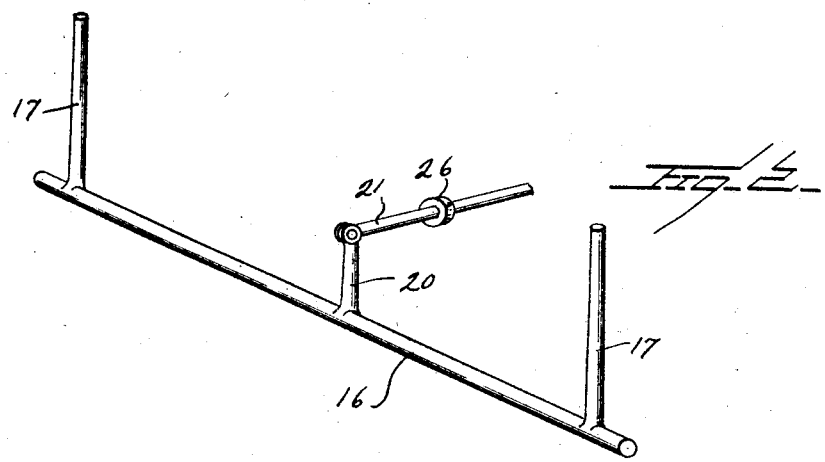
Inventor
W. Moore
By Watson E. Coleman
Attorney Patented Feb. 5, 1924.

1,482,656

UNITED STATES PATENT OFFICE.

WILLIAM MOORE, OF MICHIGAMME, MICHIGAN.

TILTING HEADLIGHT.

Application filed January 8, 1923. Serial No. 611,340.

*To all whom it may concern:*

Be it known that I, WILLIAM MOORE, a citizen of the United States, residing at Michigamme, in the county of Marquette and State of Michigan, have invented certain new and useful Improvements in Tilting Headlights, of which the following is a specification, reference being had to the accompanying drawings.

This invention relates to headlight mountings and control mechanism and has for an important object thereof a mounting and control for the headlights of an automobile or the like whereby the light rays from the lights may be deflected to the ground while passing another car to prevent the rays thereof from dazzling the driver thereof.

A further and important object of the invention is to provide a mechanism of this character which is simple, which is capable of application to substantially all makes of cars, and which is readily operated.

A still further object of the invention is to provide a mechanism of this character which is free from that unpleasant rattling noise ordinarily accompanying such mechanisms due to the vibration to which the same are subjected.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a side elevation partially in section of a vehicle showing a headlight mounting and operating mechanism therefor applied to the same; and Figure 2 is a perspective view of the headlight mounting detached.

Referring now more particularly to the drawings, the numeral 10 designates the cockpit of an automobile, 11 the engine receiving space which is divided from the cockpit by the dash 12 and which is terminated at its opposite end by the radiator 13. The numeral 14 designates the side frames of the chassis.

In accordance with my invention the chassis side frames 14 have mounted thereon bearings 15 which receive the ends of a shaft 16 extending transversely of the car. This shaft 16 is provided adjacent the ends thereof with correspondingly directed arms 17 which are adapted for the reception of the clamping yokes 18 of headlights 19 and upon which the headlights may be vertically adjusted. The shaft 16 is provided to one side of the center thereof with a further arm 20 to which is connected a reach rod 21 extending through the radiator 13, engine compartment 11, dash 12 and into the cockpit 10 where the rear end thereof is pivotally connected with the free end of a foot lever 22 pivoted to the floor of the cockpit. Within the compartment 11 the reach rod 21 is provided with a hook 23 to which is connected one end of a spring 24, the opposite end of which is connected to the forward face of the dash, as indicated at 25, this spring being normally under a slight tension and tending to shift the reach rod rearwardly. Rearward movement of the reach rod is limited by an adjustable stop member 26 mounted upon the reach rod and abutting the forward face of the radiator.

In the operation of the device, when the foot pedal is engaged, the shaft 16 will be rotated in the bearings 15 causing the headlights 19 to have the rays thereof directed toward the ground. Upon release of the foot lever the spring 24 acts to return the shaft to its normal position, rotating the same until the stop member 26 comes into engagement with the radiator. Attention is directed to the fact that the stop member not only determines positively the proper positioning of the lights 19 but may be employed to assist in focusing these headlights. In many districts the requirements of the law are that the headlights shall focus in such a manner that they do not cast any direct rays above a given distance from the ground at a point a given distance in advance of the vehicle. By adjusting the stop member upon the reach rod the angularity of the substantially vertical arms 17 of the shaft 16 may be altered to direct these rays more or less toward the ground so that a proper focus is obtainable.

It will, of course, be obvious that the construction hereinbefore set forth is capable of many changes and modifications without materially departing from the spirit of my invention and I accordingly do not limit myself to such specific structure except as hereinafter claimed.

I claim:—

In combination with a vehicle embodying a cockpit and a dash, a transversely disposed shaft arranged at the forward end of the vehicle for rotation, substantially vertical supports rigid to the shaft and adapted for the reception of headlights, an arm associated with the shaft, a reach rod connected at one end to said arm and having its rear end extending through said dash and into said cockpit, a pivoted foot lever within the cockpit and with which the rear end of the reach rod is pivotally connected, means normally urging the reach rod rearwardly comprising a spring secured at one end to the front wall of the cockpit and having its opposite end secured to a hook carried by said rod, and an adjustable stop member upon said reach rod and normally maintained in engagement with the front face of the radiator of the vehicle by the last named means.

In testimony whereof I hereunto affix my signature.

WILLIAM MOORE.